United States Patent Office 3,042,696
Patented July 3, 1962

3,042,696
PREPARATION OF ALUMINUM ALCOHOLATES
Clyde Lee Aldridge, Baker, La., assignor to Esso Research and Engineering Company, a corporation of Delaware
No Drawing. Filed July 20, 1956, Ser. No. 599,014
11 Claims. (Cl. 260—448)

This invention relates to the preparation of aluminum alcoholates by a process which comprises oxidizing aluminum alkyls under certain limited reaction conditions. More particularly this invention relates to the oxidation of aluminum trialkyls under certain critical temperatures and pressures at an extremely rapid rate. This invention also concerns the preparation of alcohols from aluminum alcoholates prepared in the above manner.

More specifically this invention concerns oxidizing an aluminum alkyl compound or mixtures of aluminum alkyls having the following formula:

wherein $R_1$, $R_2$ and $R_3$ are the same or different alkyl radicals containing from 2 to 30 carbon atoms each. These alkyl groups may be either branched or straight chain depending on the end product desired. Suitable aluminum trialkyls as starting materials for the present oxidation step may be derived by various processes, some of which will briefly be described below:

Aluminum trialkyls amenable to this process may be prepared by reacting an intermediate or high molecular weight olefin, e.g. $C_6$-$C_{20}$, with a relatively low molecular weight aluminum alkyl, e.g. aluminum triisobutyl, under elevated temperatures and pressures. As the low molecular weight aluminum alkyl starting compound the following are representative: aluminum triethyl, tripropyl, tri-n-butyl, triisobutyl, aluminum diethyl hydride, aluminum ethyl dihydride, aluminum dibutyl hydride and aluminum diethyl monobutyl. In general these low molecular weight aluminum alkyls will have the following formula:

wherein R' represents a $C_2$-$C_8$ alkyl, R'' and R''' representing either hydrogen or a $C_2$-$C_8$ alkyl. The following reaction illustrates the formation of aluminum alkyls by a displacement technique.

In order to drive the reaction to the right it is usually necessary to employ excess amounts of olefin.

A preferred and particularly attractive method of preparing intermediate and high molecular weight aluminum trialkyls involves the so-called "growth reaction." In this growth reaction generally a low or intermediate molecular weight aluminum alkyl is reacted with a low molecular weight olefin to effect the addition or growth of the olefin onto the alkyl radicals of the aluminum compound. However a displacement reaction may first occur. For these reactions the starting aluminum alkyl compound should have the following formula:

wherein R' is an alkyl radical containing from 2 to 8 carbon atoms, R'' and R''' being selected from the group consisting of hydrogen and $C_2$-$C_8$ alkyl radicals. The R's may be branched or straight chain as desired. The starting aluminum alkyl compound is reacted with a low molecular weight olefin, e.g. ethylene, propylene, n-butylene or isobutylene under elevated temperatures and pressures to produce a mixture or smear of various aluminum trialkyls herein referred to as a "growth product" wherein each alkyl radical will contain from 2 to 30 carbon atoms and wherein the average R or number of carbon atoms per alkyl group will preferably be between 6–12. The average R can be varied by controlling conditions of reaction including time, temperature, pressure and ratio of olefin feed to aluminum alkyl. Reaction conditions for this growth stage will include temperatures of from 85° to 120° C. and pressures of 200 to 5000 p.s.i.g. To expedite the growth reaction and to minimize danger due to the explosive characteristic of aluminum alkyls an inert hydrocarbon diluent is preferably employed. In the growth product mixture some of the aluminum compounds will contain three identical alkyl groups; however probably a larger portion of the mixture will contain aluminum compounds wherein the radicals are different, such as aluminum hexyl octyl dodecyl.

This growth product or an aluminum alkyl derived by a different process is then desirably oxidized to form the corresponding aluminum alcoholates in accordance with the following equation:

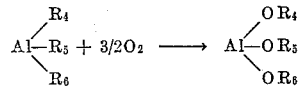

wherein $R_4$, $R_5$ and $R_6$ represent the same or different alkyl radicals containing from 2 to 30 carbon atoms each.

Subsequently the aluminum alcoholates are hydrolyzed in accordance with the procedure outlined below to form the corresponding primary alcohols.

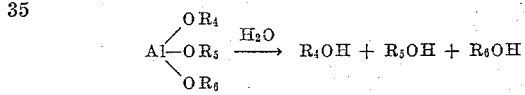

Serious difficulties have been encountered in this process, especially in the oxidation of the aluminum trialkyls. Aluminum trialkyls and aluminum alcoholates range from viscous liquids to solids depending upon the molecular weight and as a result conventional oxidation techniques have been found to be extremely tedious requiring excessively long reaction times, seriously hampering the application of this general process to a commercial operation. One solution to the slow rate of oxidation has been the use of certain diluents such as inert hydrocarbons and halogenated hydrocarbons. However, the use of high concentrations of diluent which are necessary to speed up markedly the reaction rate obviously has several drawbacks. With only a small portion of the total mixture to be oxidized being aluminum trialkyl larger reactors and more temperature control are required with less product yield per feed rate.

It has now been discovered that aluminum alkyls may be completely oxidized at a very rapid rate with or without the use of a diluent by employing superatmospheric pressures and controlling the temperatures within fairly narrow ranges. It has been found that the use of 50 to 1000 p.s.i.g., preferably 200 to 800 p.s.i.g air pressure or the equivalent oxygen partial pressure at temperatures of 5° to 125° C, although temperatures as high as 175° C. may be used, permits a rapid, complete oxidation. Substantially larger amounts of pressure and higher temperatures have been found to be undesirable, causing overoxidation of the aluminum alkyls resulting in a poor quality product and lower yields. The oxidizing gas may be air or any other oxygen containing gas such as $O_2$ diluted with nitrogen. Under some circumstances it will be desirable to keep the $O_2$ concentration in the gas low to avoid overoxidation and runaway reaction temperatures.

A diluent may be employed in the oxidation step in a concentration of 0 to 90 wt. percent of the total aluminum alkyl mixture. As the diluent any inert hydrocarbon or halogenated hydrocarbon is suitable. Typical of the hydrocarbon diluents are aromatics such as benzene, toluene and xylene, mixed hydrocarbons such as Varsol and paraffins such as pentane, hexane and heptane (normal or branched chain). Halogenated hydrocarbon diluents are typified by halogenated aromatics such as chlorobenzene, o- and p-chlorotoluene, o-dichlorobenzene, p-dichlorobenzene, benzotrichloride, 2-4 dichlorotoluene and o-xylyl chloride; halogenated acyclic hydrocarbons such as carbon tetrachloride, the freons including $CCl_2F$—$CClF_2$,

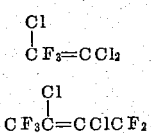

and halogenated cycloaliphatic compounds such as perfluorodimethyl cyclohexane ($C_8F_{16}$) and perfluorotetradecahydrophenanthrene ($C_{14}F_{24}$).

Hydrolysis of the thus formed aluminum alcoholates is accomplished by any one of a number of techniques. For example, the alcoholates may be hydrolyzed with 1 to 10 volumes of water at temperatures between 0 to 25° C., thus precipitating insoluble aluminum hydroxide which in turn may be aged at low temperatures, e.g. 5° to 27° C. for about 24 to 120 hours to form beta alumina trihydrate. The beta alumina trihydrate could then be calcined to prepare catalytic alumina of the valuable eta variety. After removal of the precipitated alumina the organic phase containing diluent if employed in the oxidation stage is separated from the aqueous layer and the diluent removed by any known technique such as distillation in a packed column.

Alternatively the aluminum alcoholate product mixture from the oxidation stage may be hydrolyzed in the presence of an aqueous solution of a $C_3$–$C_8$ organic acid at a pH of 3–5 and hydrolyzing temperatures of 0 to 40° C. With this type of hydrolysis the precipitated alumina is aged at 5° to 40° C. for about 1 to 25 hours and calcined to form the eta alumina. The alcohol is recovered from the organic phase as indicated above. In general 1 to 10 volumes of aqueous acid per volume of alcoholate will be employed. Typical of the acids utilizable in the acid hydrolysis technique include HCl, $HNO_3$ and mixtures thereof, propionic, butyric, valeric, lactic, glyceric, levulinic, hydracrylic, malonic, glutaric, succinic, pimelic, citric.

A third and particularly preferred method of hydrolyzing the aluminum alcoholates comprises admixing therewith from .5 to 10 volumes of aqueous ammonia per volume of the alcoholate. Preferably from 1 to 3 volumes of ammonia water per volume of alcoholate solution are employed. The concentration of ammonia contemplated is in the range of 1 to 28 wt. percent $NH_3$ with about 1.5 to 3 wt. percent being preferred. The advantage of ammonia hydrolysis is the reduced aging time required for the preparation of beta alumina trihydrate and eventually eta alumina. Temperatures employed in the ammonia hydrolysis procedure include —3° to 40° C. with the aging time of .5 to 15 hours at 0 to 40° C.

While the above three processes of hydrolyzing aluminum alcoholates are preferred since the preparation of catalytic alumina as a side product in the present process is an important economic factor to be considered, other hydrolyzing techniques which will not result in the preparation of eta alumina can be used.

As an alternative hydrolyzing technique the aluminum alcoholates may be treated with steam at about 150° to 320° C. for several hours. Steam distillation at these high temperatures is somewhat severe and may result in some degradation and discoloration of the product alcohol.

It is to be understood that the present invention is not restricted to the preparation of alcohols from aluminum alkyls. Rather the use of aluminum alcoholates in the preparation of alcohols is but one of many uses for which it may be employed. For example, the alcoholates may be reacted with organic carbonyl compounds such as ketones and aldehydes whereby the carbonyl compounds are hydrogenated to the alcohols. This reaction may be carried out in the presence of a hydrogen donor such as isopropyl alcohol.

Examples 1 and 2 show complete processes for the preparation of alcohols starting with a low molecular weight aluminum alkyl and a low molecular weight olefin.

*Example 1*

A growth product mixture of aluminum trialkyls was prepared by reacting a 6.2 wt. percent solution of aluminum triethyl in n-heptane with ethylene under about 800 p.s.i.g. at 105° C. for about 5 hours. This growth product was then placed in a high pressure bomb and a mixture of 10% $O_2$ in $N_2$ was pressured in to 100 p.s.i.g. with constant agitation. The pressure dropped almost immediately and when reaction was completed as indicated by the lack of further pressure drop the bomb was vented and repressured to 250 p.s.i.g. with 10% $O_2$ in $N_2$. The bomb was subsequently repressured three additional times; to 200 p.s.i.g. with 10% $O_2$ in $N_2$ and two times with 20% $O_2$ in $N_2$ at 300 p.s.i.g. The temperature throughout the procedure was maintained between 19° and 37° C. The oxidized mixture was then hydrolyzed with steam at 250° to 300° C. and the organic phase recovered as the distillate. The diluent was then distilled off and a mixture of $C_4$–$C_{30}$ primary straight chain alcohols was recovered, the major portion, e.g. 75–85%, falling within the range of $C_8$ to $C_{20}$.

*Example 2*

A growth reaction was carried out as in Example 1 with a 12 wt. percent solution of aluminum triethyl in n-heptane at approximately the same pressures and temperatures for about 5 hours. The growth product was then placed in a bomb and 10% $O_2$ in $N_2$ was pressured in to 500 p.s.i.g. At this total pressure, the partial pressure of $O_2$ is the equivalent to that in approximately 250 p.s.i.g. of air. The pressure drop was rapid for about 15 minutes and thereafter slowed down considerably when the $O_2$ supply was low. The bomb was then vented and repressured with 500 p.s.i.g. of 20% $O_2$ in $N_2$. Again the pressure drop was rapid for about 15 minutes until a pressure of about 425 p.s.i.g. was reached. The bomb was then repressured for a third time to 500 p.s.i.g. of 20% $O_2$ in $N_2$ but no further pressure drop was observed. The oxidation reaction is exothermic and the temperature was allowed to rise to a maximum (which occurred in the first pressuring) of about 70° C. When the reaction slowed down in each pressure reaction the temperature dropped to about 32° C. The oxidized product was then treated with a dilute solution of HCl at 100° C. and subsequently by steam distillation at 150° to 200° C. After fractionating off the diluent the alcohols recovered were found to be primary straight chain compounds. From 51.0 grams of aluminum triethyl originally used there was recovered primary straight chain alcohols averaging 12.1 carbon atoms.

To illustrate the marked increase in oxidation rate several comparative runs were made with and without the use of pressure.

*Example 3*

A growth product mixture derived by reacting 50 grams of $Al(Et)_3$ in 283 grams of normal heptane at a pressure of about 875 p.s.i.g. at 100° C. for 7 hours was oxidized in a pressure bomb with air with agitation. The pressure during oxidation was maintained between about 785 to 470 p.s.i.g. at 20° to above 80° C. Complete oxidation took about 60 minutes.

*Example 4*

50 grams of Al(Et)₃ in 283 grams of n-heptane were reacted with ethylene at 1100 to 1300 p.s.i.g. and 115° C. for 4 hours. The product was oxidized by bubbling air through the mixture at atmospheric pressure at 90° to 95° C. Complete oxidation took about 135 minutes, over twice as long as the comparative pressure run.

*Example 5*

50 grams of Al(Et)₃ in 283 grams of n-heptane were reacted with ethylene at about 830 p.s.i.g. and 100° C. for 7 hours. The growth product was then completely oxidized in a pressure bomb (with agitation) at 810 p.s.i.g. to a final 460 p.s.i.g. for a period of 48 minutes. The initial temperature was 7° C. and was not allowed to exceed 76° C. Final temperature at the end of oxidation was about 20° C.

*Example 6*

A growth product was prepared as above with 52 grams Al(Et)₃ and 296 grams of n-heptane at 900 to 1100 p.s.i.g. at 100° C. for about 8 hours. Oxidation with air without pressure required 140 minutes.

Temperature usually has some effect on the oxidation rate, the rate generally increasing with increasing temperature until about 30° C. is reached. Over about 30° C. further increase of temperature has very little effect on the rate when using a diluent. From an economics standpoint it may be desirable to operate above 30° C. since less temperature control is required. With a diluent lower temperatures may be employed; however a preferable range is 30° to 90° C. Without a diluent temperature will have a relatively substantial effect on the rate and it is particularly preferred to employ temperatures of 85° C. and higher (e.g. 125° C.) in the absence thereof.

*Example 7*

250 grams of Al(octyl)₃ are placed in a pressure bomb without a diluent. Air is pressured in to about 500 p.s.i.g. and the temperature allowed to rise to about 90° C. The oxidation in this run will require about one-quarter to one-tenth the time required for a comparable run without pressure.

What is claimed is:

1. A method of rapidly oxidizing an aluminum alkyl of the following formula:

wherein each R represents an alkyl radical containing from 2 to 30 carbon atoms which comprises contacting said aluminum alkyl with an oxygen containing gas at temperatures of 5° to 125° C. and pressures of 50 to 1000 p.s.i.g., said oxygen containing gas having an oxygen partial pressure equivalent to that of oxygen in air at such pressure range for a period of time to oxidize a substantial portion of said aluminum alkyl to the corresponding aluminum alcoholate of the following formula:

2. A method in accordance with claim 1 wherein the temperature during oxidation is maintained between 85° to 125° C.

3. A method in accordance with claim 1 wherein an inert hydrocarbon diluent is employed.

4. A method in accordance with claim 3 wherein the temperature during oxidation is maintained between 30° to 90° C.

5. A method in accordance with claim 1 wherein an inert halogenated hydrocarbon diluent is employed.

6. A method in accordance with claim 5 wherein the temperature during oxidation is maintained between 30° to 90° C.

7. A method of preparing a mixture of aluminum alcoholates which comprises contacting a mixture of aluminum trialkyls wherein each alkyl radical contains from 2 to 30 carbon atoms and wherein the average alkyl group contains from 6 to 12 carbon atoms with an oxygen containing gas at 50 to 1000 p.s.i.g., said oxygen containing gas having an oxygen partial pressure equivalent to that of oxygen in air at such pressure range and 5° to 125° C.

8. A method in accordance with claim 7 wherein an inert diluent is employed.

9. A method in accordance with claim 8 wherein the temperature during oxidation is maintained between 30° to 90° C.

10. A method of preparing primary alcohols containing from 2 to 30 carbon atoms which comprises reacting a low molecular weight aluminum alkyl with ethylene at 85° to 120° C. and 200 to 5000 p.s.i.g. to form a mixture of aluminum alkyls of the following formula:

wherein each R represents an alkyl radical containing from 2 to 30 carbon atoms, contacting said mixture of aluminum alkyls with an oxygen containing gas at 5° to 125° C. and 50 to 1000 p.s.i.g., said oxygen containing gas having an oxygen partial pressure equivalent to that of oxygen in air at such pressure range to form a mixture of aluminum alcoholates having the following formula:

hydrolyzing said mixture of aluminum alcoholates and recovering primary alcohols having from 2 to 30 carbon atoms per molecule.

11. A method in accordance with claim 10 wherein the mixture of aluminum alkyls is oxidized in the presence of an inert diluent.

References Cited in the file of this patent

UNITED STATES PATENTS

| | | |
|---|---|---|
| 2,163,720 | Vaughn | June 27, 1939 |
| 2,318,033 | Van de Griendt et al. | May 4, 1943 |
| 2,579,251 | Coates et al. | Dec. 18, 1951 |
| 2,666,076 | Rex et al. | Jan. 12, 1954 |
| 2,687,423 | Mesirow | Aug. 24, 1954 |
| 2,873,290 | Esmay et al. | Feb. 10, 1959 |
| 2,892,858 | Ziegler | June 30, 1959 |

OTHER REFERENCES

Uses and Applications of Chemicals and Related Materials, Gregory, Reinhold Publishing Corporation, 1939.

King et al.: Fundamentals of College Chemistry (1954), page 175.

Ziegler et al.: Angew. Chem., vol. 67, No. 16, August 21, 1955, pages 425 and 426.